US011564156B2

(12) United States Patent
Estevez

(10) Patent No.: US 11,564,156 B2
(45) Date of Patent: Jan. 24, 2023

(54) PROVISION OF DATA ANALYTICS IN A TELECOMMUNICATION NETWORK

(71) Applicant: Samsung Electronics Co., Ltd., Suwon-si (KR)

(72) Inventor: David Gutierrez Estevez, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 158 days.

(21) Appl. No.: 16/899,021

(22) Filed: Jun. 11, 2020

(65) Prior Publication Data

US 2020/0396677 A1    Dec. 17, 2020

(30) Foreign Application Priority Data

Jun. 11, 2019 (GB) .................................. 1908329
Nov. 7, 2019 (GB) .................................. 1916213
May 29, 2020 (GB) .................................. 2008103

(51) Int. Cl.
*H04W 48/18* (2009.01)
*H04L 41/5003* (2022.01)
(Continued)

(52) U.S. Cl.
CPC ......... *H04W 48/18* (2013.01); *H04L 41/5003* (2013.01); *H04W 28/0268* (2013.01); *H04W 28/24* (2013.01)

(58) Field of Classification Search
CPC .......... H04L 41/5003; H04W 28/0268; H04W 28/24; H04W 48/18
See application file for complete search history.

(56) References Cited

U.S. PATENT DOCUMENTS 11,140,568 B2 * 10/2021 Rahman ................ H04W 24/10
2013/0094400 A1    4/2013 Anthony, Jr. et al.
(Continued)

FOREIGN PATENT DOCUMENTS

WO    2018/161850 A1    9/2018
WO    2020/183254 A1    9/2020

OTHER PUBLICATIONS

Samsung et al., Conclusion for Key Issue 14, 3GPP TSG-SA WG2 Meeting #132, S2-1904009 (revision of S2-1903980), Apr. 8-12, 2019, Xi'an, China.
(Continued)

*Primary Examiner* — Melanie Jagannathan
(74) *Attorney, Agent, or Firm* — Jefferson IP Law, LLP

(57) ABSTRACT

A communication method and a system for converging a $5^{th}$-Generation (5G) communication system for supporting higher data rates beyond a $4^{th}$-Generation (4G) system with a technology for Internet of Things (IoT) is provided. The disclosure is applied to intelligent services based on the 5G communication technology and the IoT-related technology, such as a smart home, a smart building, a smart city, a smart car, a connected car, health care, digital education, a smart retail, security and safety services. A method performed by a first entity performing a network data analytics function (NWDAF) is provided. The method includes receiving, from a second entity performing network function (NF), a first message for requesting observed service experience analytics, the first message including single-network slice selection assistance information (S-NSSAI) indicating a network slice, transmitting, to a third entity performing application function (AF) associated with the S-NSSAI, a second message for requesting service data associated with the observed service experience analytics, the second message including information on at least one application, receiving, from the third entity, the service data including at least one service (Continued)

experience for the at least one application, identifying the observed service experience analytics based on the service data, and transmitting, to the second entity, the observed service experience analytics.

8 Claims, 8 Drawing Sheets

(51) Int. Cl.
*H04W 28/02* (2009.01)
*H04W 28/24* (2009.01)

(56) References Cited

U.S. PATENT DOCUMENTS

| | | | |
|---|---|---|---|
| 2015/0257012 | A1 | 9/2015 | Zhang |
| 2018/0262924 | A1 | 9/2018 | Dao et al. |
| 2019/0222489 | A1* | 7/2019 | Shan ............... H04M 15/8022 |
| 2020/0288296 | A1 | 9/2020 | Fiorese et al. |
| 2021/0105193 | A1* | 4/2021 | Chong ............... H04L 41/5067 |
| 2021/0168651 | A1* | 6/2021 | Marquezan ........... H04W 24/02 |
| 2021/0204198 | A1* | 7/2021 | Xin ..................... H04L 41/5025 |
| 2021/0219151 | A1* | 7/2021 | Fiorese ............. H04W 36/0055 |
| 2021/0219185 | A1* | 7/2021 | Xin ....................... H04W 28/10 |
| 2021/0250814 | A1* | 8/2021 | Poe ................... H04W 28/0236 |
| 2021/0282053 | A1* | 9/2021 | Xin ....................... H04W 28/24 |
| 2021/0282072 | A1* | 9/2021 | Xin ....................... H04W 24/02 |
| 2021/0337553 | A1* | 10/2021 | Chong ............... H04L 41/5067 |
| 2021/0337555 | A1* | 10/2021 | Fan ..................... H04L 41/0896 |

OTHER PUBLICATIONS

China Mobile et al., Proposed New SID on Enablers for Network Automation for 5G—Phase 2, 3GPP TSG-SA WG2 Meeting #133, S2-1906722 (Revision of S2-1906055/5157/3996/3961/3876/3097), May 13-17, 2019, Reno, USA.
Ericsson et al., OAM and AF as consumer of analytics, SA WG2 Meeting #133, S2-1906766, May 13-17, 2019, Reno, Nevada, USA.
3GPP TS 23.288 V16.1.0, 3rd Generation Partnership Project; Technical Specification Group Services and System Aspects; Architecture enhancements for 5G System (5GS) to support network data analytics services (Release 16), Sep. 2019, Sophia Antipolis, France.
3GPP TS 23.288 V16.2.0, 3rd Generation Partnership Project; Technical Specification Group Services and System Aspects; Architecture enhancements for 5G System (5GS) to support network data analytics services (Release 16), Sep. 2019, Sophia Antipolis, France.
3rd Generation Partnership Project; Technical Specification Group Services and System Aspects; Architecture enhancements for 5G System (5GS) to support network data analytics services (Release 16), 3GPP TS 23.288 V1.0.0 Jun. 3, 2019 sections 6.3.1-6.4.5; and figures 6.4.4-1, 6.4.5-1.
3rd Generation Partnership Project; Technical Specification Group Services and System Aspects; Study of Enablers for Network Automation for 5G (Release 16), 3GPP TR 23.791 V16.1.0, Mar. 25, 2019 sections 6.1-6.3.
3rd Generation Partnership Project; Technical Specification Group Core Network and Terminals; 5G System; Network Data Analytics Services; Stage 3 (Release 15), 3GPP TS 29.520 V15.3.0, Mar. 28, 2019 sections 4-5.
3rd Generation Partnership Project; Technical Specification Group Services and System Aspects; Study of Enablers for Network Automation for 5G (Release 16), 3GPP TR 23.791 V16.2.0, Jun. 10, 2019, XP051756433, http://www.3gpp.org/ftp/tsgsa/WG2_Arch/Latest_SA2_Specs/DRAFT_INTERIM/Archive/23791-g20_CRs_Implemented.zip Scope, Sections 5.2, 6.1, 6.3, 6.6, 6.13, 6.14, 7.
3rd Generation Partnership Project; Technical Specification Group Services and System Aspects; Architecture enhancements for 5G System (5GS) to support network data analytics services (Release 16), 3GPP TS 23.288, V1.0.0, Jun. 3, 2019, pp. 1-52, XP051753923, Scope, Sections 6, 7.
China Mobile, Slice QoE related Network Data Analytics, 3GPP TSG-SA WG2 Meeting #133, S2-1905795 Revision of S2-190xxxx), Reno, USA, May 7, 2019, XP051735975 Retrieved from the Internet:URL: http://www.3gpp.org/ftp/Meetings%5F3GPP%5FSYNC/SA2/Docs/S2%2DI905795%2Ezip Sections 6.x.2, 6.x.3, 6.x.4; figures 6.x.4-1; tables 6.X.3-1.
Huawei et al., Updates for QoS Profile Provisioning, 3GPP TSG-SA WG2 Meeting #132, S2-1904002 (Revision of S2-1903972/3916/3809), Xi'an, China, Apr. 11, 2019, XP051720041, Retrieved from the Internet:URL: http://www.3gpp.org/ftp/tsg%5Fsa/WG2%5FArch/TSGS2%5FI32%5FXiAn/Docs/S2%2DI904002%2Ezip the whole document.
Huawei et al., Discussion about NWDAF interactions with OAM, SA WG2 Meeting #128, S2-186972 WAS6666, Vilnius, Lithuania, Jul. 6, 2018, XP051538426, Retrieved from the Internet:URL: http://www.3gpp.org/ftp/tsg%5Fsa/WG2%5FArch/TSGS2%5FI28%5FVilnius/Docs/S2%2DI86972%2Ezip the whole document.
International Search Report dated Sep. 23, 2020, issued in International Application No. PCT/KR2020/007617.
European Search Report dated Oct. 12, 2020, issued in European Application No. 20179490.6.
Samsung, Observed serviced experience analytics for a slice, S2-1907353, 3GPP TSG-SA WG2 Meeting #134, Jun. 18, 2019, Sapporo, Japan.
United Kingdom Search and Examination Report dated Jul. 20, 2021, issued in United Kingdom Application No. GB2008103.0.
United Kingdom Search and Examination Report dated Nov. 5, 2020, issued in United Kingdom Application No. GB2008103.0.

\* cited by examiner

PROVISION OF DATA ANALYTICS IN A TELECOMMUNICATION NETWORK

CROSS-REFERENCE TO RELATED APPLICATION(S)

This application is based on and claims priority under 35 U.S.C. § 119(a) of a U.K. patent application number 1908329.4, filed on Jun. 11, 2019, in the United Kingdom Intellectual Property Office, a U.K. patent application number 1916213.0, filed on Nov. 7, 2019, in the United Kingdom Intellectual Property Office, and a U.K. patent application number 2008103.0, filed on May 29, 2020, in the United Kingdom Intellectual Property Office, the disclosure of each of which is incorporated by reference herein in its entirety.

BACKGROUND

1. Field

The disclosure relates to improved means for the provision of data analytics in a communication network. More particularly, the disclosure relates to the provision of data analytics per network slice.

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

In addition to the background art described above, there is an ever-increasing desire to improve the performance of communication networks so that user experience can be enhanced without the network operator investing unnecessarily in excessive equipment. In other words, network operators are keen to optimize the performance of their installed fleet of infrastructure.

In the past, network optimization was largely a manually-managed process, with skilled operators adjusting network parameters as required. Over time, more automation has been introduced. More recently still, Artificial Intelligence (AI) and Machine Learning (ML) techniques have be employed.

In 5th Generation (5G) networks, there are different network structures and protocols which have been employed to enhance user experience.

Therefore, there is a need for a method to make best use of these new structures and protocols to improve network performance and/or user experience.

Aspects of the disclosure are to address at least the above-mentioned problems and/or disadvantages and to provide at least the advantages described below. Accordingly, an aspect of the disclosure is to provide a unit for use in a communication network operable to receive input from at least one data source related to a network slice, process the received input data, and output observed service experience data analytics related to the network slice.

Another aspect of the disclosure is to provide methods and apparatus for the provision of the data analytics per network slice, so that improvements of network performance and user experience can be achieved.

Additional aspects will be set forth in part in the description which follows and, in part, will be apparent from the description, or may be learned by practice of the presented embodiments.

In an embodiment of the disclosure, the unit is a network data analytics function (NWDAF).

In an embodiment of the disclosure, the processing of the received data from at least one input source comprises aggregating observed service experience data analytics of a plurality of applications running on the network slice and a plurality of user equipments (UEs) associated with the network slice.

In an embodiment of the disclosure, the received data from at least one input data source is aggregated.

In an embodiment of the disclosure, the aggregation is performed by a process of averaging.

In an embodiment of the disclosure, the unit is further operable to perform a mapping operation whereby data received from the at least one data source indicative of observed service experience is mapped to the network slice.

In accordance with an aspect of the disclosure, a method of providing slice-specific data analytics in a communication network is provided. The method includes service consumer subscribing to an Analytics service provided by a NWDAF, including providing a network slice identifier, the NWDAF requesting data from at least one network function (NF), the at least one NF providing the NWDAF with the requested data in response, the NWDAF subscribing to a service data subscription service in connection with at least one application function (AF), the at least one AF providing service data to the NWDAF in response, and the NWDAF processing the data received from the at least one NF and the at least one AF to provide data analytics related to a network slice to the service consumer.

In accordance with another aspect of the disclosure, the operation of the NWDAF requesting data from at least one network function (NF) is provided. The operation includes requesting application identifiers and wherein the operation of the NF providing the NWDAF with the requested data in response includes providing the requested application identifiers.

In an embodiment of the disclosure, the data received from the at least one application function (AF) is aggregated.

In an embodiment of the disclosure, the NWDAF maps the data received from the at least one network function (NF) and the at least one application function (AF), such that the data analytics output is related to the network slice.

In an embodiment of the disclosure, the mapping is performed based on one or more of single-network slice selection assistance information (S-NSSAI), subscription permanent identifier (SUPI) and applications active on the network slice.

In accordance with an aspect of the disclosure, a method performed by a first apparatus performing network data analytics function (NWDAF) is provided. The method comprises: receiving, from a second entity performing network function (NF), a first message for requesting observed service experience analytics, the first message including single-network slice selection assistance information (S-NSSAI) indicating a network slice; transmitting, to a third entity performing application function (AF) associated with the S-NSSAI, a second message for requesting service data associated with the observed service experience analytics, the second message including information on at least one application; receiving, from the third entity, the service data including at least one service experience for the at least one application; identifying the observed service experience analytics based on the service data; and transmitting, to the second entity, the observed service experience analytics.

In an embodiment of the disclosure, wherein identifying the observed experience analytics for the network slice comprises: transmitting, to a fourth entity performing network function (NF), a third message for requesting network data associated with the information on the at least one application; receiving, from the fourth entity, the network data including information on quality of service (QoS) flow; and identifying the observed service experience analytics based on the service data and the network data.

In an embodiment of the disclosure, wherein the observed service experience analytics includes service experience for the network slice and the at least one service experience for the at least one application, wherein the service experience for the network slice includes at least one of service experience for a UE, service experience for a group of UEs, or service experience for any UE in the network slice, wherein each of the at least one service experience for the at least one application includes at least one of service experience for a UE, service experience for a group of UEs, or service experience for any UE, and wherein the observed service experience analytics includes statistic of performance for the network slice and prediction of performance for the network slice.

In an embodiment of the disclosure, wherein the service experience for the network slice is determined as an average of the at least one service experience for the at least one application.

In accordance with an aspect of the disclosure, a method performed by a second entity performing network function (NF) is provided. The method comprises: transmitting, to a first entity performing network data analytics function (NWDAF), a first message for requesting observed service experience analytics, the first message including single-network slice selection assistance information (S-NSSAI) indicating a network slice; and receiving, from the first entity, the observed service experience analytics, and wherein the observed service experience analytics is identified based on service data including at least one service experience for at least one application.

In accordance with an aspect of the disclosure, a first apparatus performing network data analytics function (NWDAF) is provided. The first apparatus comprises: a transceiver; and a controller coupled with the transceiver and configured to: control the transceiver to receive, from a second entity performing network function (NF), a first message for requesting observed service experience analytics, the first message including single-network slice selection assistance information (S-NSSAI) indicating a network slice, control the transceiver to transmit, to a third entity performing application function (AF) associated with the S-NSSAI, a second message for requesting service data associated with the observed service experience analytics, the second message including information on at least one application, control the transceiver to receive, from the third entity, the service data including at least one service experience for the at least one application, identify the observed service experience analytics based on the service data, and control the transceiver to transmit, to the second entity, the observed service experience analytics.

In accordance with an aspect of the disclosure, a second apparatus performing network function (NF) is provided. The second apparatus comprises: a transceiver; and a controller coupled with the transceiver and configured to: control the transceiver to transmit, to a first entity performing network data analytics function (NWDAF), a first message for requesting observed service experience analytics, the first message including single-network slice selection assistance information (S-NSSAI) indicating a network slice, and control the transceiver to receive, from the first entity, the observed service experience analytics, wherein the observed service experience analytics is identified based on service data including at least one service experience for at least one application.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 6, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

Figure 1:
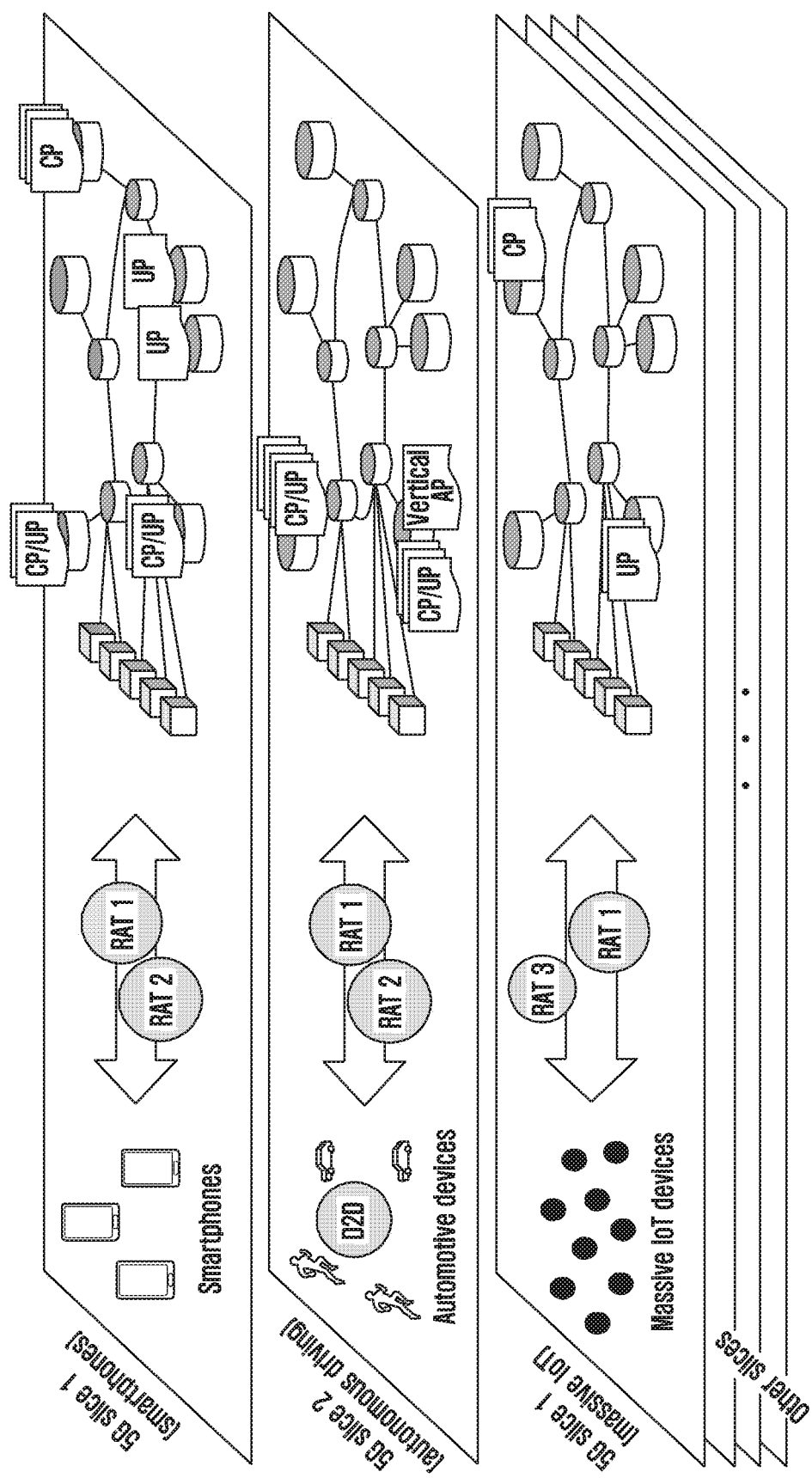
FIG. 1 illustrates a slice structure in a 5th generation (5G) network according to an embodiment of the disclosure.

FIG. 1 illustrates a slice structure in 5G networks according to an embodiment of the disclosure. Network slicing is a type of virtual networking architecture allowing for better network flexibility through the partitioning of network architectures into virtual elements. In essence, network slicing allows the creation of multiple virtual networks atop a shared physical infrastructure.

Referring to FIG. 1, there are three such slices, although, as indicated, more or fewer may be provided. Different slices can be configured and optimized for different functions/users. In the example shown, different slices are configured for smal tphones, automotive devices and Massive IoT devices respectively. In practice, different slices can be configured in a very flexible way and, importantly, the physical resources assigned to different slices can be adapted as required.

A problem with existing slicing arrangements is that it is not always possible to obtain performance data of sufficient granularity to allow effective optimization and resource allocation to occur. Alternatively, such data that is available is required to be processed in the Operation and Administration Maintenance (OAM) function, remote from the Core Network (CN).

Part of the control of a 5G network, which permits enhanced performance involves the use of data analytics, which are employed to assist in the management and optimization of resources. A key component of this function is the network data Analytics function (NWDAF) which is used for data collection and data analytics. An NWDAF may be used for analytics for one or more Network Slices. The NWDAF may serve use cases belonging to one or several domains, e.g., service quality, traffic steering, dimensioning, security.

The input data to the NWDAF may come from multiple sources, and the resulting actions undertaken by the consuming network function (NF) or application function (AF) may concern several domains (e.g., Mobility management, Session Management, service quality management, Application layer, Security management, NF life cycle management).

Figure 2:
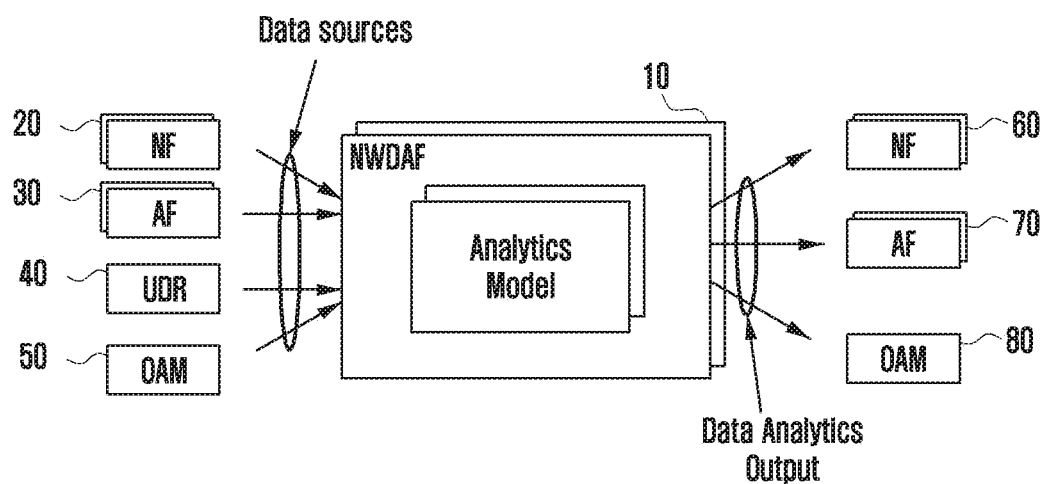
FIG. 2 illustrates a representation of a network data analytics function (NWDAF) employed in a 5G network according to an embodiment of the disclosure.

FIG. 2 illustrates a representation of NWDAF employed in a 5G network according to an embodiment of the disclosure.

Referring to FIG. 2, NWDAF implementation, whereby the NWDAF 10 receives inputs from one or more NFs 20, one or more AFs 30, the unified data repository (UDR) 40 and the OAM 50 according to an embodiment of the disclosure. The data received from these sources is processed according to one or more analytics models and outputs are created and fed back, in this instance to one or more NFs 70, one or more AFs 70 and the OAM 80. Note that NFs 20, 60 may be the same NFs or at least have some commonality. Similarly for AFs 30, 70 and OAM 50, 80.

A problem with NWDAF implementations in the prior art is that they are unable to provide service experience data analytics on a per-slice basis or, if they are, such analytics require the involvement of the OAM 50, 80, which is undesirable and takes this functionality away from the Core Network (especially the Control Plane, CP). This is useful in terms of optimizing network performance and/or configuration on a slice basis. This is increasingly beneficial when more and more network features are organized on a slice basis.

Referring to FIG. 2, embodiments of the disclosure permit the creation and use of application service experience analytics on a slice level in the Control Plane i.e., without the direct involvement of the OAM.

The operation of an embodiment is best illustrated by contrasting with the prior art operation.

Figure 3:
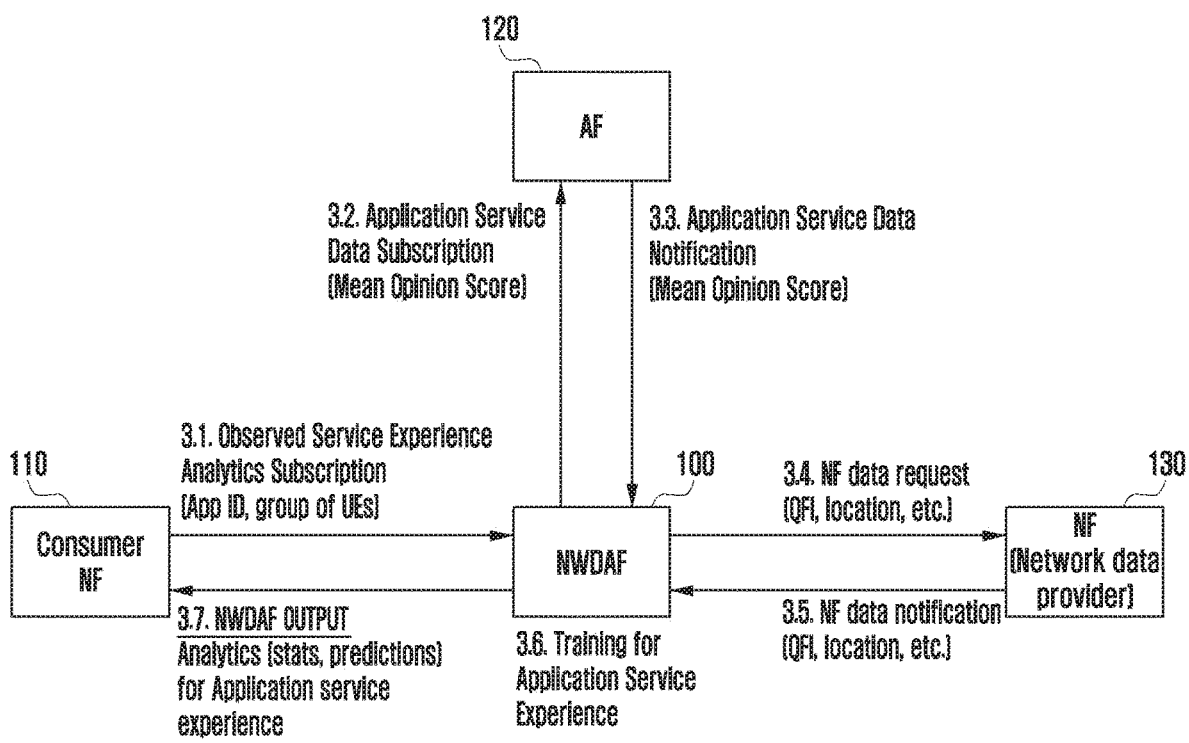
FIG. 3 illustrates a representation of a function of a NWDAF according to an embodiment of the disclosure.

FIG. 3 illustrates a representation of a function of an NWDAF according to an embodiment of the disclosure.

Referring to FIG. 3, the NWDAF 100 is communicatively coupled to at least one Consumer NF 110, at least one AF 120 and at least one NF (network data provider) 130. Messages are passed between each of these and the NWDAF 100 as follows:

3.1 The Consumer NF 110 makes an Observed Service Experience Analytics Subscriptions request (e.g., App ID, group of UEs) to NWDAF 100. In the context of this application, "Observed Service Experience" (OSE) is used interchangeably with "Quality of Experience" (QoE)

3.2 NWDAF 100 may requests an Application Service Data Subscription (Mean Opinion Score) to AF 120.

3.3 AF 120 reports Application Service Data Notification (Mean Opinion Score) to NWDAF 100.

3.4 NWDAF 100 may submits NF data request (Qos flow identifier (QFI), location, and the like) to NF 130.

3.5 NF 130 provides NF data notification (QFI, location, and the like) to NWDAF 100.

3.6 NWDAF 100 implements training algorithm to learn from supplied data.

3.7 NWDAF 100 provides data analytics to Consumer NF 110, including statistics of past performance or predictions of future performance.

The numerals (3.1, 3.2, and the like) only indicate corresponding messages, and do not mean that any transmission order. Also, the messages may or may not be transmitted.

Referring to FIG. 3, the operation represents the prior art and makes no allowance at all for network slicing.

Figure 4:
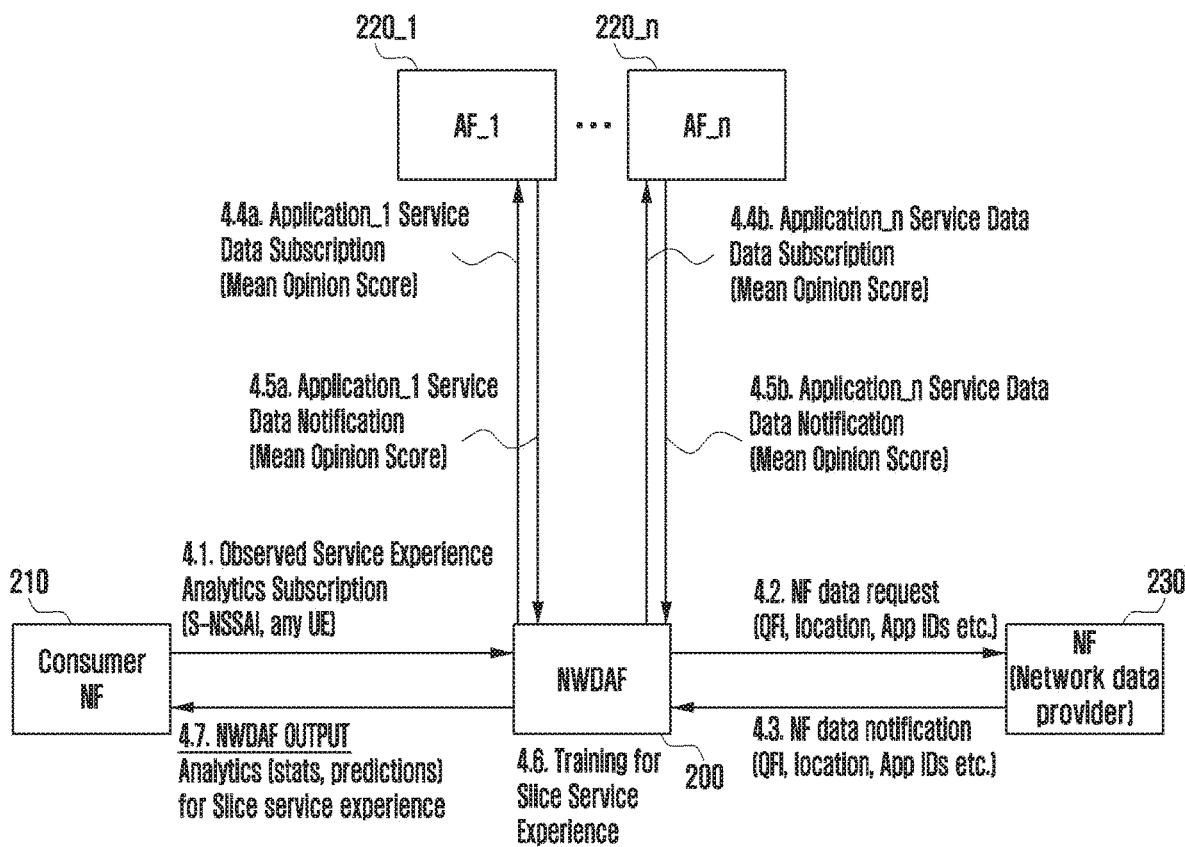
FIG. 4 illustrates a representation of a function of a NWDAF according to an embodiment of the disclosure.

FIG. 4 illustrates a representation of a function of a NWDAF according to an embodiment of the disclosure.

Referring to FIG. 4, the Consumer NF 210, AF_1-AF_n 220 and NF 230 are analogous and function substantially the same as the similarly numbered components in FIG. 3. The NWDAF 200 is operable according to an embodiment of the disclosure to deal with different messages and/or data and is therefore operable to provide analytics to the Consumer NF 210 on a per-slice basis.

The messages passed between the various entities are 4.1 The Consumer NF 210 makes an Observed Service Experience Analytics Subscriptions request (S-NSSAI, any UE) to NWDAF 200. Note that S-NSSAI (single-network slice selection assistance information) is an identifier of a particular slice and "any UE" refers to the presence of any UE on that slice. By setting target of analytics reporting to "any UE", the Consumer NF 210 obtains analytics for any UE on that network slice. Meanwhile, it is possible to request analytics for one or several UE(s) or a group of UEs as well as any UE on that network slice. In this embodiment, it is assumed that analytics for any UE on that network slice is requested. App ID(s) related to identifier of particular application for which analytics is requested may be included in the Observed Service Experience Analytics Subscription request, as described in FIG. 3. In this case, the Consumer NF 210 may obtain analytics for application(s), which operate(s) on that network slice, corresponding to the App ID(s). Or, the App ID(s) may not be included in the request for analytics, in this case, the Consumer NF 210 obtains analytics for all application operating on that network slice. In this embodiment, it is assumed that the App ID(s) is(are) included in the message 4.1.

4.2 NWDAF 200 may makes NF data request (QFI, location, App ID(s), and the like) to NF 230.

4.3 NF 230 provides NF data notification (QFI, location, App ID(s), and the like) to NWDAF 200.

4.4a NWDAF 200 may requests an Application_1 Service Data Subscription (Mean Opinion Score) to AF_1 220_1. The Application_1 corresponds to one of the App IDs included in the message 4.1. The message 4.4a may include the App ID corresponding to the Application_1.

4.5a AF_1 220_1 reports Application_1 Service Data Notification (Mean Opinion Score) to NWDAF 200.

4.4b and 4.5b repeat 4.4a and 4.5a n times for each application AF.

4.6 NWDAF 200 implements training algorithm to learn from supplied data for a Slice Service Experience.

4.7 NWDAF 200 provides data analytics to Consumer NF 210, including statistics of past performance or predictions of future performance on a per-slice basis. The data analytics provided is typically either statistics relating to the past e.g., QoS at a certain previous time and/or a prediction of future performance. The prediction may be based on the past performance and/or may make use of additional information available regarding future events.

The numerals (4.1, 4.2, and the like) only indicate corresponding messages, and do not mean that any transmission order. Also, the messages may or may not be transmitted.

The Consumer NF 210 may specify if it wishes to receive data analytics in a particular form e.g., past statistics or prediction of future performance.

As an example, the Consumer NF 210 is the network slice selection function (NSSF). An example of the operation of NSSF is as follows:

NSSF monitors Network Slice service experience by subscribing to NWDAF slice service experience analytics for the S-NSSAI(s) in operation (e.g., S-NSSAI_1, S-NSSAI_2, S-NSSAI_3).

NSSF may detect a drop of service experience if/when the service experience of S-NSSAI_1 is predicted to drop or the statistics of the past indicate a continuous drop.

Then, NSSF may perform slice level load distribution with new UE registrations and/or PDU session establishments and allocates them to a different S-NSSAI (e.g., S-NSSAI_2).

As a result, NSSF assists with guaranteeing the service level agreement (SLA) of the Network Slices in the 5GC In addition, in slice level load distribution, based on the service experience analytics on the network slice(s), NSSF may perform slice selection efficiently. More specifically, when a UE needs to register with the network to get authorized to receive services, the UE initiates the registration procedure by transmitting, to an access and mobility management function (AMF), a registration request. AMF subscribes the Network slice information from NSSF by invoking Nnssf NSSelection Get service operation. NSSF collects Network Slice service experience by subscribing to NWDAF slice service experience analytics for the S-NSSAI(s) (e.g., S-NSSAI_1, S-NSSAI-2, S-NSSAI3 and the like), as described above. Based on the service experience(s) corresponding to the S-NSSAI(s), NSSF efficiently selects the network slice for serving the UE and notifies information on the selected network slice to AMF.

The above examples illustrate how a consumer NF 210 may benefit from improved data analytics at a slice level, which can not only improve user experience, but also improve overall network performance by ensuring a better load distribution and allocation of finite resources.

Examples of NF (network data provider) 130, 230 entities include access and mobility function (AMF), session management function (SMF), user plane function (UPF).

By comparing FIGS. 3 and 4, the different parameters required in order to implement an embodiment of the disclosure are clear. In particular, the use of S-NSSAI in relation to any UE makes use of the defined slice identifier, which has previously been unused in the provision of analytics.

An advantage of performing analytics provision in this way, away from the OAM, is that the OAM can often be a bottleneck in the network and by performing these operations in the Control Plane (CP), overall network performance can be enhanced. Furthermore, the OAM can be inflexible and embodiments of the disclosure may be more easily adapted to meet the needs of network operators.

By providing analytics according to an embodiment of the invention, NFs are able to leverage statistics and predictions to thereby replace or complement functionality previously provided by the OAM.

Further, embodiments of the disclosure are able to differentiate between observed service experience for application performance and for UE (or group of UEs) performance.

Per-slice metrics are derived by means of per-UE observed service experience values.

By means of the embodiment shown in FIG. 4, it is possible to determine slice-level analytics by utilizing observed service experience for applications as well as observed service experience analytics for a single UE or group of UEs. This is by virtue of the new parameters introduced and described in relation to FIG. 4.

Furthermore, embodiments of the disclosure permit multi-application aggregation for slice QoE analytics by means of a mechanism to aggregate application observed service experience analytics to obtain slice-wide analytics in control plane, CP.

Still further, multi-UE multi-application slice QoE analytics mapping and aggregation are provided by means of a mapping of the set of UEs and the set of applications to a single slice. In addition, a mechanism is provided to aggregate observed service analytics for a UE or group of UEs to obtain slice-wide analytics in control plane, CP.

Embodiments of the disclosure utilize observed service experience to derive slice-level analytics at the NWDAF 200. This is achieved by the NWDAF 200 requesting the necessary data in relation to applications and/or UEs.

In an embodiment of the disclosure, QoE analytics can be used to guarantee a service level agreement (SLA) per slice. This can be done either by aggregating applications service experience over the same slice and/or by mapping and aggregating service experience by a set of UEs using a number of applications over the same slice.

In another embodiment of the disclosure, observed service experience analytics are provided for applications, and slice QoE analytics are derived by averaging. In this alternative, slice-wide analytics are derived by employing observed service experience analytics for a set of applications. An aggregation mechanism (e.g., averaging) is further used to derive a slice QoE metric as data analytics.

A particular problem which is addressed and overcome by embodiments of the disclosure is that prior art observed service experience output analytics are not suitable for per-slice QoE measurements. This is because deriving a suitable slice QoE metric in multi-UE multi-application scenarios over a single slice requires an Application-UE mapping, yet no such mapping is provided as analytics output in the prior art. In the prior art, attempts have been made to address this shortcoming by providing a list of Subscription Permanent Identifier (SUPIs) for which the analytics is requested, as well as a list of applications on the slice, but no mapping from applications to UEs is provided. As such, a slice QoE metric derived using prior art analytics derived from such output analytics would be incorrect since the request may be just for a subset of UEs.

In a still further embodiment of the disclosure, there is included a mapping of UEs and applications to the slice target of the optimization in the slice QoE analytics, obtained through observed user experience. The mapping can be performed by providing the following structure of output parameters:

S-NSSAI is given as output for observed service experience

A list of applications is provided for that slice, each of which contains the list of SUPIs utilizing such slice The observed service experience is provided as an output parameter of that list As an alternative, IDs of registered subscribers to the slice may be also provided.

To aggregate per-UE per-Application measurements, averaging may be used. The averaging may be a simple arithmetic averaging, use of a media value, Root Mean Square averaging or any form of averaging suitable in the circumstances.

Figure 5:
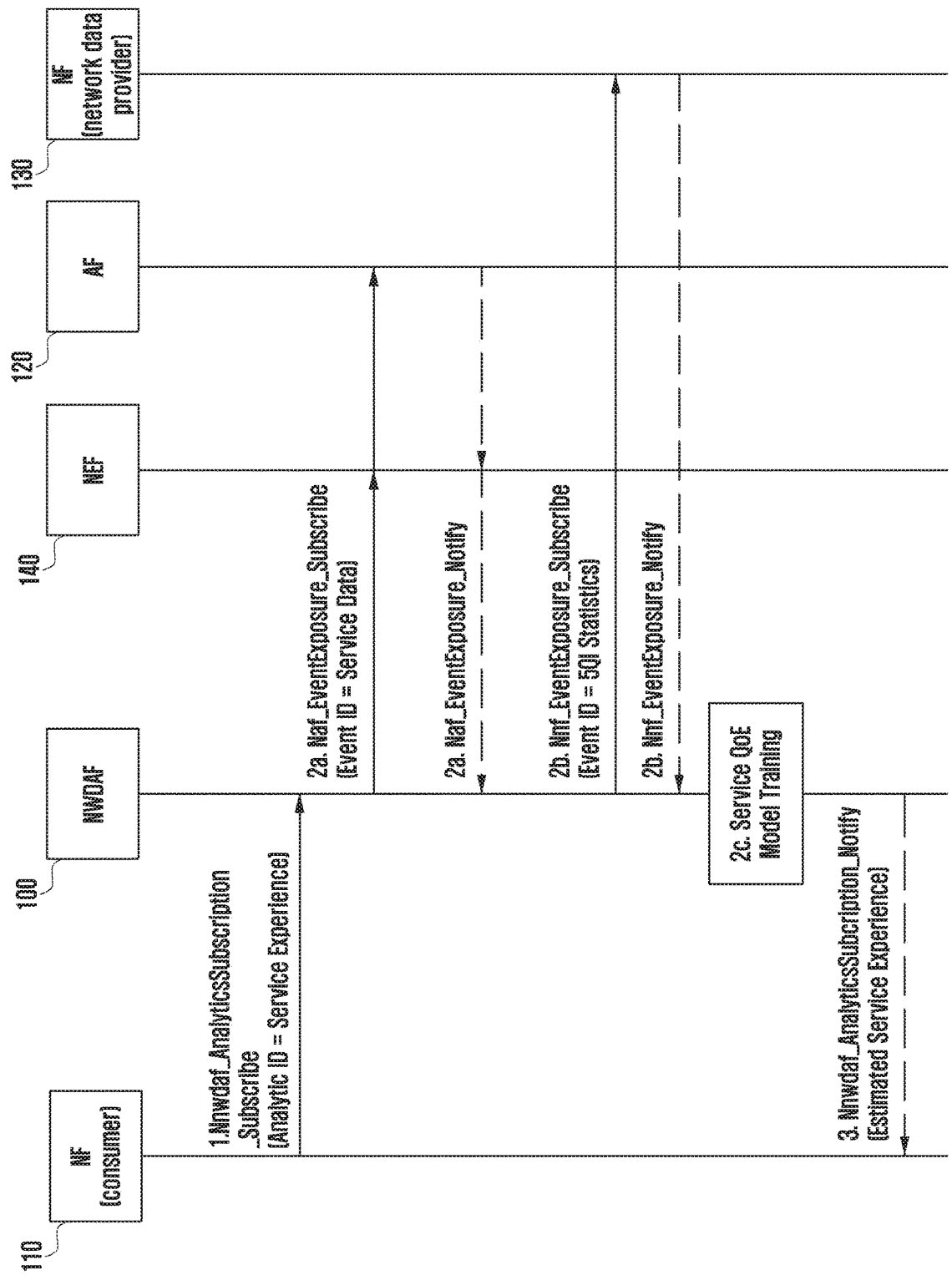
FIG. 5 illustrates a message flow according to an embodiment of the disclosure.
Figure 6:
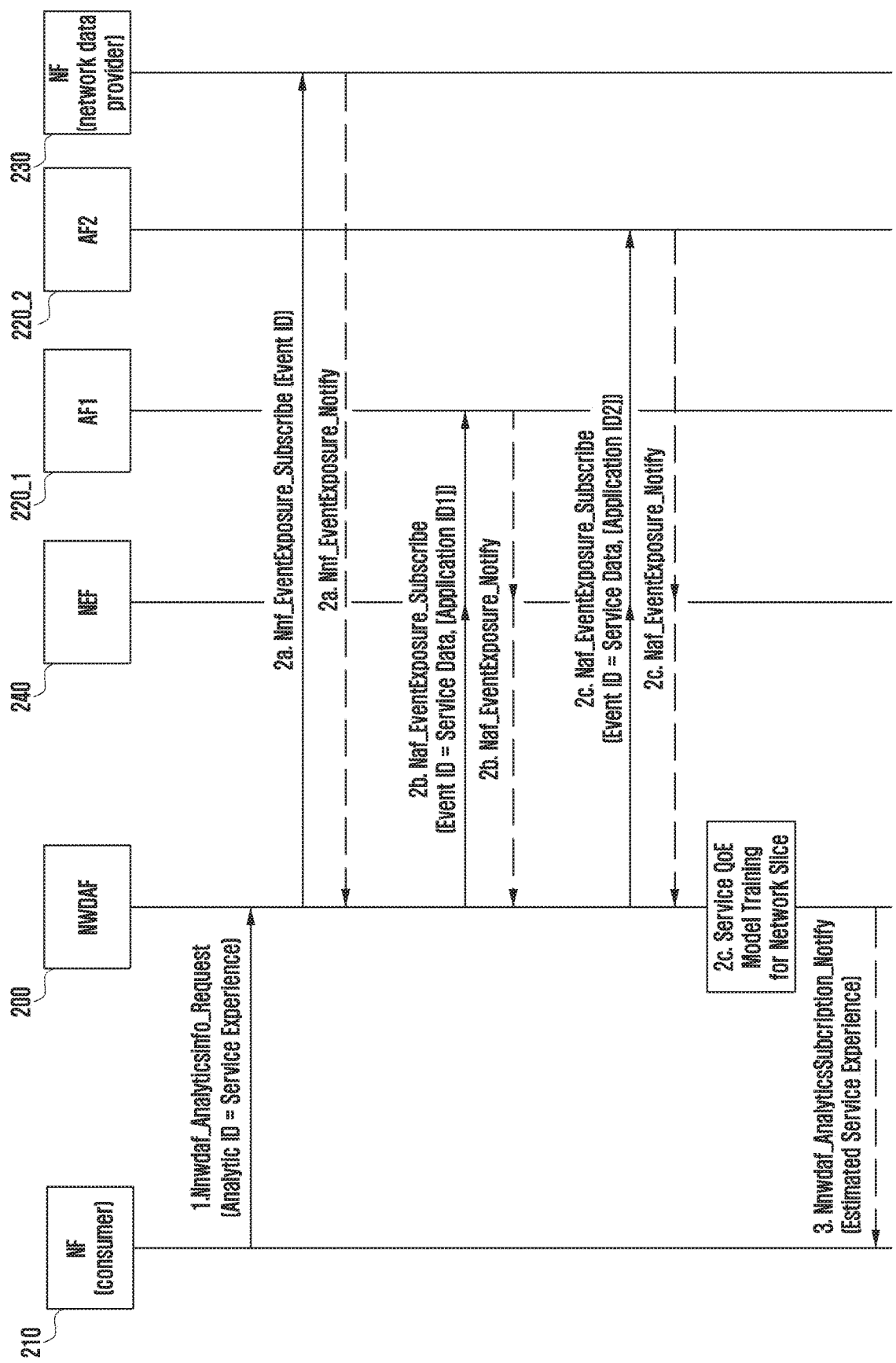
FIG. 6 illustrates a message flow according to an embodiment of the disclosure.

FIGS. 5 and 6 are analogous to FIGS. 3 and 4 respectively and show call flows in a manner typically used in the applicable standards specifications.

FIG. 5 illustrates a message flow according to an embodiment of the disclosure.

Referring to FIG. 5, the prior art call flows and relate to the prior art system shown in FIG. 3.

FIG. 6 illustrates a message flow according to an embodiment of the disclosure.

Referring to FIG. 6, in operation 1, the consumer 210 requests the Analytics ID "Service Experience" for all UEs or a group of UEs on a particular Network Slice, identified by an S-NSSAI.

In operation 2*a*, NWDAF 200 may subscribes to the network data from NF 230 by invoking Nnf_EventExposure_Subscribe service operation with the Event ID.

In addition, service experience data may need to be collected from multiple Applications.

In operations 2*b* and 2*c*, if each Application is hosted in a separate AF, NWDAF 200 may subscribes the service data in Table 1 from the different AFs (220_1, 220_2, and the like) by invoking Nnef_EventExposure_Subscribe or Naf_EventExposure_Subscribe services for each Application (Event ID=Service Data, Event Filter information= (Application ID, Area of Interest), Target of Event Reporting=Any UE) as defined TS 23.502. FIG. 6 shows an example procedure with two AFs 220_1, 220_2. If one AF provides the service experience data of multiple Applications, the set of Application IDs is provided by NWDAF 200 to the AF with the Naf_EventExposure_Subscribe service operation, as defined TS 23.502.

TABLE 1

| Information | Description |
| --- | --- |
| Application ID | To identify the service and support analytics per type of service (the desired level of service) |
| IP filter information | Identify a service flow of the UE for the application |

TABLE 1-continued

| Information | Description |
|---|---|
| Locations of Application | Locations of application represented by a list of DNAI(s). The NEF 240 may map the AF-Service-Identifier information to a list of DNAI(s) when the DNAI(s) being used by the application are statically defined. |
| Service Experience | Refers to the QoE per service flow as established in the SLA and during on boarding. It can be either e.g., MOS or video MOS as specified in ITU-T P.1203.3 [11] or a customized MOS |
| Timestamp | A time stamp associated to the Service Experience provided by the AF, mandatory if the Service Experience is provided by the ASP. |

With the data received from at least one AF 220_1, 220_2 (directly or via NEF 240), (and possibly from at least one NF 230), NWDAF 200 provides data analytics to the consumer 210 in operation 3, including statistics of past performance or predictions of future performance on a per-slice basis.

The statistics of past performance are provided as Table 2 below.

TABLE 2

| Information | Description |
|---|---|
| S-NSSAI | Identifies the Network Slice for which analytics information is provided. |
| ServiceExperience (1 ... n) | List of observed service experience information for each Application. |
| >Application ID | Identification of the application. |
| > Service Experience Type | Type of Service Experience analytics, e.g., on voice, video, other. |
| >Service Experience | Service Experience over the Analytics target period (average, variance). |
| >SUPI list (1 ... n) | List of SUPI(s) for each application, applicable only to detailed Service Experience. |
| >Ratio | Estimated percentage of UEs with similar service experience (in the group, or among all UEs). |
| >Spatial validity | Area where the estimated Service Experience applies. If Area of Interest information was provided in the request or subscription, spatial validity may be a subset of the requested Area of Interest. |
| >Validity period | Validity period as defined in clause 6.1.3. |
| Slice service experience | Service experience across applications on a Network Slice over the Analytics target period (average, variance). |

The predictions of future performance are provided as Table 3 below.

TABLE 3

| Information | Description |
|---|---|
| S-NSSAI | Identifies the Network Slice for which analytics information is provided. |
| ServiceExperience (1 ... n) | List of observed service experience information for each Application. |
| >Application ID | Identification of the application. |
| >Service Experience Type | Type of Service Experience analytics, e.g., on voice, video, other. |
| >Service Experience | Service Experience over the Analytics target period (average, variance). |
| >SUPI list (1 ... n) | List of SUPI(s) for each application, applicable only to detailed Service Experience. |

TABLE 3-continued

| Information | Description |
|---|---|
| >Ratio | Estimated percentage of UEs with similar service experience (in the group, or among all UEs). |
| >Spatial validity | Area where the estimated Service Experience applies. If Area of Interest information was provided in the request or subscription, spatial validity may be a subset of the requested Area of Interest. |
| >Validity period | Validity period as defined in clause 6.1.3. |
| Slice service experience | Service experience across applications on a Network Slice over the Analytics target period (average, variance). |

Figure 7:
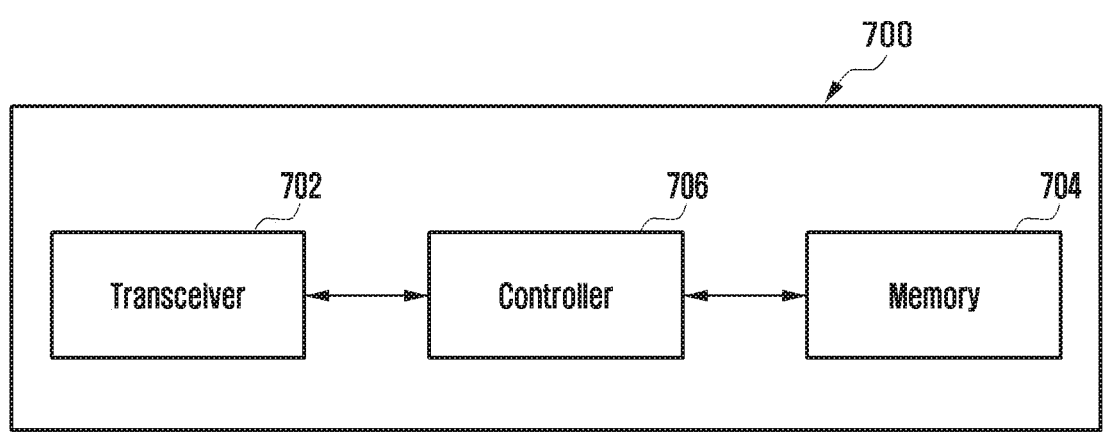
FIG. 7 illustrates a block diagram of an entity performing network data analytics function (NWDAF) according to an embodiment of the disclosure.

FIG. 7 illustrates a block diagram of an entity performing network data analytics function (NWDAF) according to an embodiment of the disclosure.

Referring to FIG. 7, an entity performing NWDAF 700 of an embodiment includes a transceiver 702, a memory 704 and a controller 706.

The transceiver 702 is capable of transmitting/receiving signals to/from other entities.

The memory 704 is capable of storing at least one of the following:

information related to the entity performing NWDAF 700 and information transmitted/received via the transceiver 702.

The controller 706 is capable of controlling operations of the entity performing NWDAF 700. The controller 706 is capable of controlling the entity performing NWDAF to perform operations related to the entity performing NWDAF as described in the embodiments.

Figure 8:
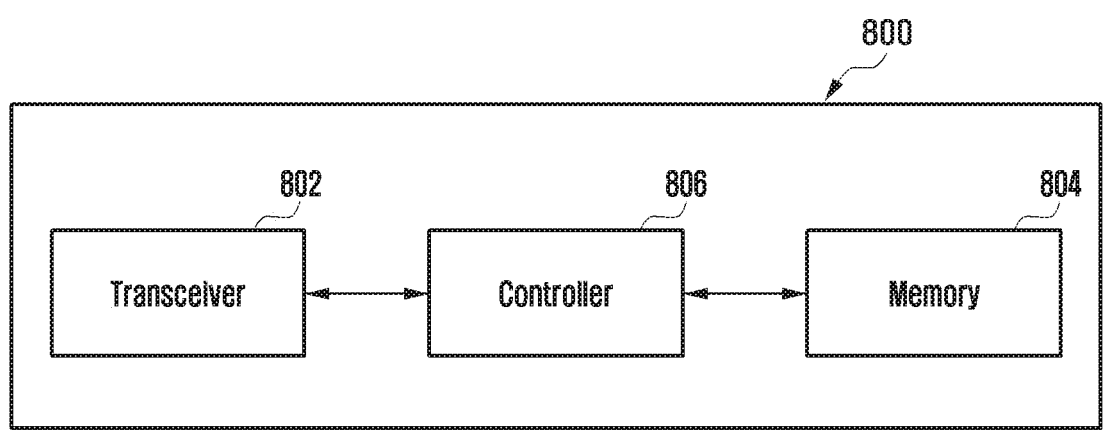
FIG. 8 illustrates a block diagram of an entity performing network function (NF) according to an embodiment of the disclosure.

FIG. 8 illustrates a block diagram of an entity performing network function (NF) according to an embodiment of the disclosure.

Referring to FIG. 8, an entity performing NF 800 of an embodiment includes a transceiver 802, a memory 804, and a controller 806.

The transceiver 802 is capable of transmitting/receiving signals to/from other entities.

The memory 804 is capable of storing at least one of the following:

information related to the entity performing NF 800 and information transmitted/received via the transceiver 802.

The controller 806 is capable of controlling operations of the entity performing NF 800. The controller 806 is capable of controlling the entity performing NF to perform operations related to the entity performing NF as described in the embodiments.

At least some of the example embodiments described herein may be constructed, partially or wholly, using dedicated special-purpose hardware. Terms, such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments of the disclosure, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment of the disclosure, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the operations of any method or process so disclosed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first entity performing a network data analytics function (NWDAF), the method comprising:
   receiving, from a second entity performing a network function (NF), a message for requesting observed service experience information for a network slice, the message including single-network slice selection assistance information (S-NSSAI) indicating the network slice;
   obtaining service data including information on a service experience for an application related to the observed service experience information;
   obtaining network data including information on a quality of service (QoS) flow associated with the application;
   identifying the observed service experience information for the network slice based on the service data and the network data; and
   transmitting, to the second entity, the observed service experience information for the network slice,
   wherein the observed service experience information for the network slice includes information on a network slice service experience across at least one application including the application, and
   wherein the network slice service experience across the at least one application is obtained by averaging at least one service experience for the at least one application.

2. The method of claim 1,
   wherein the message for requesting the observed service experience information further includes information indicating at least one user equipment (UE),
   wherein, in case that the at least one UE is a UE on the network slice, the observed service experience information for the network slice includes a service experience for the UE,
   wherein, in case that the at least one UE is a group of UEs on the network slice, the observed service experience information for the network slice includes a service experience for the group of UEs, and
   wherein, in case that the at least one UE is any UE on the network slice, the observed service experience information for the network slice includes a service experience for all UEs on the network slice.

3. A method performed by a second entity performing a network function (NF), the method comprising:
   transmitting, to a first entity performing a network data analytics function (NWDAF), a message for requesting observed service experience information for a network slice, the message including single-network slice selection assistance information (S-NSSAI) indicating the network slice; and
   receiving, from the first entity, the observed service experience information for the network slice,
   wherein the observed service experience information on the network slice is identified based on service data and network data,
   wherein the service data includes information on a service experience for an application related to the observed service experience information,
   wherein the network data includes information on a quality of service (QoS) flow associated with the application,
   wherein the observed service experience information for the network slice includes information on a network slice service experience across at least one application including the application, and
   wherein the network slice service experience across the at least one application is obtained by averaging at least one service experience for the at least one application.

4. The method of claim 3,
   wherein the message for requesting the observed service experience information further includes information indicating at least one user equipment (UE),
   wherein, in case that the at least one UE is a UE on the network slice, the observed service experience information for the network slice includes a service experience for the UE,
   wherein, in case that the at least one UE is a group of UEs on the network slice, the observed service experience information for the network slice includes a service experience for the group of UEs, and
   wherein, in case that the at least one UE is any UE on the network slice, the observed service experience information for the network slice includes a service experience for all UEs on the network slice.

5. A first apparatus performing a network data analytics function (NWDAF), the first apparatus comprising:
a transceiver; and
a controller coupled with the transceiver and configured to:
control the transceiver to receive, from a second entity performing a network function (NF), a message for requesting observed service experience information for a network slice, the message including single-network slice selection assistance information (S-NSSAI) indicating the network slice,
obtain service data including information on a service experience for an application related to the observed service experience information,
obtain network data including information on a quality of service (QoS) flow associated with the application,
identify the observed service experience information for the network slice based on the service data and the network data, and
control the transceiver to transmit, to the second entity, the observed service experience information for the network slice,
wherein the observed service experience information for the network slice includes information on a network slice service experience across at least one application including the application, and
wherein the network slice service experience across the at least one application is obtained by averaging at least one service experience for the at least one application.

6. The first apparatus of claim 5,
wherein the message for requesting the observed service experience information further includes information indicating at least one user equipment (UE),
wherein, in case that the at least one UE is a UE on the network slice, the observed service experience information for the network slice includes a service experience for the UE,
wherein, in case that the at least one UE is a group of UEs on the network slice, the observed service experience information for the network slice includes a service experience for the group of UEs, and
wherein, in case that the at least one UE is any UE on the network slice, the observed service experience information for the network slice includes a service experience for all UEs on the network slice.

7. A second apparatus performing a network function (NF), the second apparatus comprising:
a transceiver; and
a controller coupled with the transceiver and configured to:
control the transceiver to transmit, to a first entity performing a network data analytics function (NWDAF), a message for requesting observed service experience information for a network slice, the message including single-network slice selection assistance information (S-NSSAI) indicating the network slice, and
control the transceiver to receive, from the first entity, the observed service experience information for the network slice,
wherein the observed service experience information on the network slice is identified based on service data and network data,
wherein the service data includes information on a service experience for an application related to the observed service experience information,
wherein the network data includes information on a quality of service (QoS) flow associated with the application,
wherein the observed service experience information for the network slice includes information on a network slice service experience across at least one application including the application, and
wherein the network slice service experience across the at least one application is obtained by averaging at least one service experience for the at least one application.

8. The second apparatus of claim 7,
wherein, the message for requesting the observed service experience information further includes information indicating at least one user equipment (UE),
wherein, in case that the at least one UE is a UE on the network slice, the observed service experience information for the network slice includes a service experience for the UE,
wherein, in case that the at least one UE is a group of UEs on the network slice, the observed service experience information for the network slice includes a service experience for the group of UEs, and
wherein, in case that the at least one UE is any UE on the network slice, the observed service experience information for the network slice includes a service experience for all UEs on the network slice.

* * * * *